US007721015B2

(12) United States Patent
Mohrmann et al.

(10) Patent No.: US 7,721,015 B2
(45) Date of Patent: May 18, 2010

(54) DYNAMIC AUDIO JACK COLORS

(75) Inventors: Vaden Albert Mohrmann, Round Rock, TX (US); Philip Joseph Grossmann, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 355 days.

(21) Appl. No.: 11/530,301

(22) Filed: Sep. 8, 2006

(65) Prior Publication Data

US 2008/0126583 A1 May 29, 2008

(51) Int. Cl.
*G06F 3/00* (2006.01)

(52) U.S. Cl. .......................................... 710/15; 710/14

(58) Field of Classification Search .................... 710/15
See application file for complete search history.

(56) References Cited

U.S. PATENT DOCUMENTS 6,971,907 B1 * 12/2005 Stroud ........................ 439/490
2003/0023329 A1 * 1/2003 Brooks et al. ................ 700/94

* cited by examiner

*Primary Examiner*—Henry W. H. Tsai
*Assistant Examiner*—John B Roche
(74) *Attorney, Agent, or Firm*—Haynes and Boone, LLP

(57) ABSTRACT

For dynamically adjusting a color code corresponding to a task performed by an input/output (I/O) port, a retasking request for the I/O port is received. The retasking request may be generated in response to detecting a plugging in of a multimedia device into the I/O port. The retasking request includes switching the task from a first task to a second task. In response to the retasking request the task performed by the I/O port is automatically reconfigured from the first task to the second task. The color code is automatically changed from a first color code corresponding to the first task to a second color code corresponding to the second task in response to the reconfiguring, without user intervention.

20 Claims, 4 Drawing Sheets

DYNAMIC AUDIO JACK COLORS

BACKGROUND

The present disclosure relates generally to information handling systems, and more particularly to tools and techniques for enhancing user experience of multimedia entertainment systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, entertainment, enterprise data storage, or global communications. In addition, IHSs may include a variety of hardware and software components that may be configured to process, store, and communicate information and may include one or more computer systems, data storage systems, and networking systems.

Presently, due to advances in multimedia technologies such as high definition (HD) surround sound audio, and HD digital video disc (DVD) based feature films, and/or electronic video games deploying the latest in audiovisual effects, users are able to enjoy theater-like surround sound experience on their IHSs, which may include proprietary entertainment systems. As the multimedia IHSs get more advanced and users migrate from a traditional stereo output requiring 2 cables to a 5.1 (or 7.1) channel surround sound audio output requiring 6 (or 8) cables, the complexity of the cable connections for the multimedia IHS often causes confusion and degrades user experience. A well known solution for reducing the complexity in connecting the various components of the IHS, including the multimedia components, is the use of color coded cable jacks, connectors, and/or receptacles.

However, traditional color coded connectors used to interconnect multimedia components may not be flexible to handle dynamically changing use and/or assignments of HD audio devices, such as dynamic retasking of a function assigned to a jack, which may be desired for improving user experience.

SUMMARY

Applicants recognize an existing need to improve dynamically adjusting colors of a color coded connector in response a change in task and/or function performed by an input/output audio port of an IHS, absent the disadvantages found in the prior techniques discussed above.

The foregoing need is addressed by the teachings of the present disclosure, which relates to improving user experience in interconnecting HD audio devices. According to one embodiment, a retasking request for the input/output (I/O) port is received. The retasking request may be generated in response to detecting a plugging in of a multimedia device into the I/O port. The retasking request includes switching the task from a first task to a second task. In response to the retasking request the task performed by the I/O port is automatically reconfigured from the first task to the second task. The color code is automatically changed from a first color code corresponding to the first task to a second color code corresponding to the second task in response to the reconfiguring, without user intervention.

In one aspect, a HD audio system includes an audio codec having an I/O port and a corresponding light source, the corresponding light source being controlled by the audio codec to emit a color in accordance with a task performed by the I/O port. The HD audio system includes capability to automatically identify a multimedia device being plugged in to the audio codec via the I/O port. In response to the identification of the multimedia device, the task performed by the I/O port is changed from a first task to a second task. The audio codec automatically adjusts the color of the light source from a first color corresponding to the first task to a second color corresponding to the second task.

Several advantages are achieved according to the illustrative embodiments presented herein. The embodiments advantageously provide an improved user experience while connecting different HD audio components. For example, a user may elect to insert a headphone into a front jack of an audio codec device. In response to the insertion of the headphone, the IHS may automatically disable or mute the rear speakers and indicate the change by changing the colors assigned to the rear jack from a green color (indicating in use) to a black color (indicating not in use). In addition, the dynamic matching of the colors improves user experience by signaling an error when a user attempts to perform a non-supported function, such as inserting a microphone in a headphone jack.

DETAILED DESCRIPTION

Figure 1:
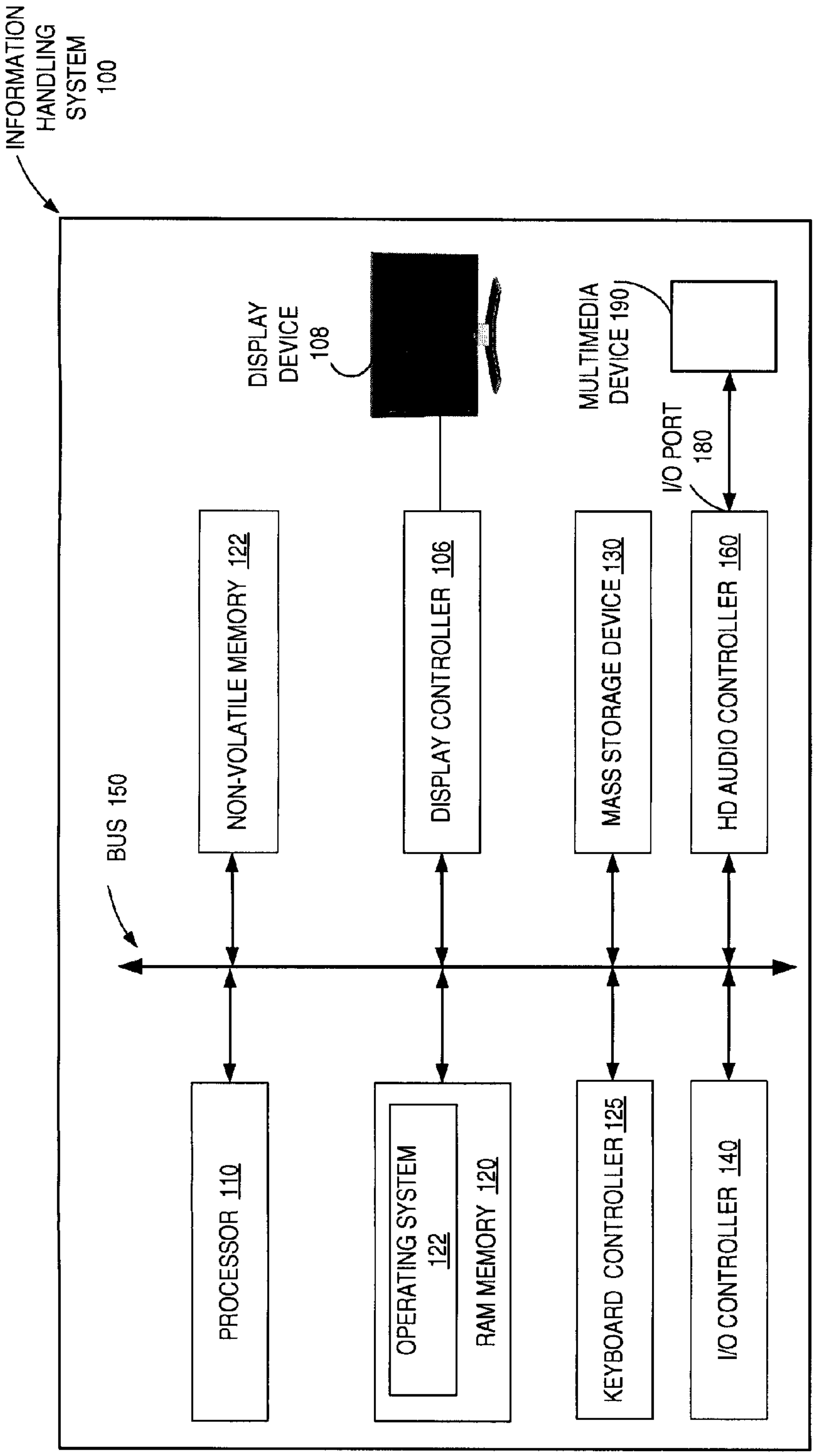
FIG. 1 illustrates a block diagram of an IHS, according to an embodiment.

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices, boards, cards, modules, blocks, and/or components described herein may be implemented as hardware (including discrete components, integrated circuits and systems-on-a-chip 'SOC'), firmware (including application specific integrated circuits and programmable chips) and/or software or a combination thereof, depending on the application requirements. Similarly, the functionality of various mechanical elements, members, and/or components for forming modules, sub-assemblies and assemblies assembled in accordance with a structure for an apparatus may be implemented using various materials and coupling techniques, depending on the application requirements.

As described earlier, traditional color coded connectors used to interconnect multimedia components may not be flexible to handle dynamically changing use and/or assignments of HD audio devices, such as dynamic retasking of a function assigned to a jack, which may be desired for improving user experience. Therefore, a need exists to improve user experience in interconnecting HD audio devices. According to one embodiment, in a method and system for dynamically adjusting a color code corresponding to a task performed by an I/O port, a retasking request for the I/O port is received. The retasking request may be generated in response to detecting a plugging in of a multimedia device into the I/O port. The retasking request includes switching the task from a first task to a second task. In response to the retasking request the task performed by the I/O port is automatically reconfigured from the first task to the second task. The color code is automatically changed from a first color code corresponding to the first task to a second color code corresponding to the second task in response to the reconfiguring, without user intervention.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the IHS may be a personal computer, including notebook computers, personal digital assistants, cellular phones, gaming consoles, a network storage device, or any other suitable device and may vary in size, shape, performance, functionality, and price. The IHS may include random access memory (RAM), one or more processing resources such as central processing unit (CPU) or hardware or software control logic, read only memory (ROM), and/or other types of nonvolatile memory. Additional components of the IHS may include one or more disk drives, one or more network ports for communicating with external devices as well as various I/O devices, such as a keyboard, a mouse, and a video display. The IHS may also include one or more buses operable to receive/transmit communications between the various hardware components.

FIG. 1 illustrates a block diagram of an IHS 100, according to an embodiment. The IHS 100 includes a processor 110, which is coupled to a bus 150. The bus 150 serves as a connection between the processor 110 and other components of the IHS 100. An input device 126 is coupled to the processor 110 to provide input to the IHS 100. Examples of input devices may include keyboards, touchscreens, and pointing devices such as mouses, trackballs and trackpads. Software programs, including instructions, and data are stored on a mass storage device 130, which is coupled to processor 110 via the bus 150. Mass storage devices may include such devices as hard disks, optical disks, magneto-optical drives, floppy drives and the like. The IHS 100 further includes a display controller 106 to generate displays that are displayable on a display device 108, the display controller 106 being coupled to the processor 110 by the bus 150. A system memory 120, which may also be referred to as RAM or main memory, is coupled to the processor 110 to provide the processor with fast storage to facilitate execution of computer programs by the processor 110. In an embodiment, a chassis (not shown) houses some or all of the components of IHS 100. It should be understood that other buses and intermediate circuits can be deployed between the components described above and processor 110 to facilitate interconnection between the components and the processor 110.

The IHS 100 may also include a non-volatile ROM 122 memory, an I/O controller 140 for controlling various other I/O devices. For example, the I/O controller 140 may include a serial and/or parallel I/O bus controller. A particular type of serial I/O controller is a keyboard controller 125. It should be understood that the term "information handling system" is intended to encompass any device having a processor that executes instructions from a memory medium.

The IHS 100 is shown to include the mass storage device 130 connected to the processor 110, although some embodiments may not include the mass storage device 130. In a particular embodiment, the IHS 100 may include additional hard disks. The bus 150 may include data, address and control lines. In an exemplary, non-depicted embodiment, not all devices shown may be directly coupled to the bus 150. In one embodiment, the IHS 100 may include multiple instances of the bus 150. The multiple instances of the bus 150 may be in compliance with one or more proprietary standards and/or one or more industry standards such as peripheral component interconnect (PCI), PCI express (PCIe), industry standard architecture (ISA), universal serial bus (USB), system management bus (SMBus), and similar others. A communications device 142, such as a network interface card and/or a radio device, may be connected to the bus 150 to enable wired and/or wireless information exchange between the IHS 100 and other devices (not shown).

In a particular embodiment, the IHS 100 includes a HD audio controller 160 for controlling I/O from/to a multimedia device 190 via an I/O port 180. The multimedia device 190 may include audio/video peripheral devices such as headphones, microphones, speakers, MP3 players, DVD players, cellular phones, PDA's, and similar others. The HD audio controller 160 is coupled via the bus 150 to the RAM 120 to store/retrieve audio streaming data. In a particular embodiment, the HD audio controller 160 may be substantially similar to the I/O controller 140. Although not shown, additional I/O ports and additional multimedia devices may be supported. In a particular embodiment, the HD audio controller 160 supports plug-and-play type technology that supports automatic discovery of all compatible devices coupled to the one or more I/O ports. The coupling may be wired and/or wireless. Additional details of the operation of the HD audio components are described with reference to FIGS. 2 and 3.

The processor 110 is operable to execute the instructions and/or operations of the IHS 100. The memory medium, e.g., RAM 120, preferably stores instructions (also known as a "software program") for implementing various embodiments of a method in accordance with the present disclosure. An operating system (OS) 122 of the IHS 100 is a type of software program that controls execution of other software programs, referred to as application software programs. An example of an application program may include a program to play a CD or a DVD. In various embodiments the instructions and/or software programs may be implemented in various ways, including procedure-based techniques, component-based techniques, and/or object-oriented techniques, among others. Specific examples include assembler, C, XML, C++ objects, Java and Microsoft's .NET technology.

Figure 2:
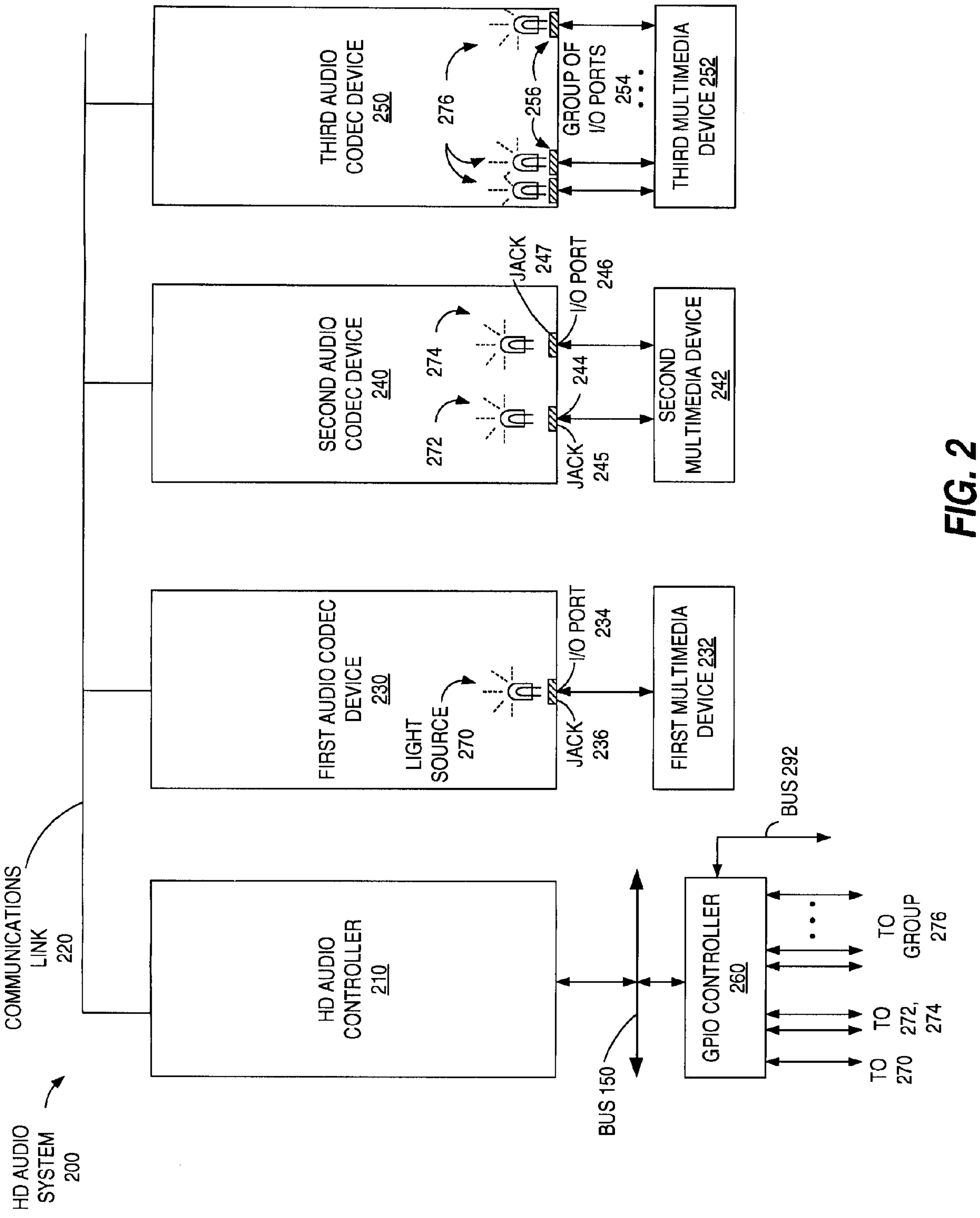
FIG. 2 illustrates a block diagram of a HD audio system with a general purpose I/O controller for color control, according to an embodiment.

FIG. 2 illustrates a block diagram of a HD audio system 200 with a general purpose I/O controller for color control, according to an embodiment. In the depicted embodiment, the HD audio system 200 includes a HD audio controller 210, coupled to at least one audio codec device (ACD) via a communications link (or bus) 220. The HD audio controller 210 is coupled to the bus 150 described with reference to FIG. 1. In the depicted embodiment, the at least one ACD includes a first ACD 230, a second ACD 240, and a third ACD 250. In an embodiment, each one of the 3 ACD's includes at least one I/O port for connecting with audio peripheral components/devices such as the multimedia device 190 described with reference to FIG. 1. In a particular embodiment, the HD audio system 200 supports plug-and-play technology. That is, the HD audio system 200 is able to automatically sense the presence of the multimedia device 190 when a connector of the multimedia device 190 is plugged into a corresponding mating jack of the I/O port. By using techniques such as measuring resistance, the HD audio system 200 is able identify the multimedia device 190 and its functionality, and retask one or more I/O ports to support the functionality. A manufacturer of each ACD may provide one or more functions such as a telephony interface (e.g., voice over IP), audio/video signal processing, encoding/decoding, data compression, audio codec user interface/controls, speech recognition, and similar other.

The number of I/O ports and characteristics thereof that are included with each ACD may depend on the functions provided by the ACD. That is, the particular number of I/O ports supported by each ACD and the particular task(s) supported by each I/O port may be determined by the functionality of the ACD. For example, an ACD configured as an array of audio recorders may include up to 16 I/O ports, each I/O port configured to receive an analog input from a microphone, an ACD configured as a digital interface may include one I/O port capable of sending and/or receiving data in accordance with the Sony/Philips Digital Interconnect Format standard, and an ACD configured for a 5.1 speaker surround sound audio output may include 6 I/O ports, each I/O port functioning as an analog audio output to drive the 6 speakers.

In the depicted embodiment, the first ACD 230 is coupled to a first multimedia device 232 via an I/O port 234, the second ACD 240 is coupled to a second multimedia device 242 via two I/O ports 244 and 246, and the third ACD 250 is coupled to a third multimedia device 252, via a group of I/O ports 254 that may include up to 16 individual I/O ports. Each one of the I/O ports 234, 244, 246 and the port group 254 has a corresponding jack 236, 245, 247, and the jack group 256 for receiving a mating connector from the multimedia device. Although not shown, the HD audio system 200 may include less number of ACD's than the 3 shown or may include more than 3 ACD's. In a particular embodiment, the HD audio controller 210 is substantially the same as the HD audio controller 160 and the multimedia devices 232, 242, and 252 are substantially the same as the multimedia device 190 described with reference to FIG. 1. In an exemplary, non-depicted embodiment, each one of the ACD may include converters such as an analog-to-digital converter (ADC) to change input analog audio signals into a digital bitstream, and a digital-to-analog converter (DAC) to convert the digital bitstream received from the HD audio controller 210 into an analog audio output signal. In an embodiment, the output of the ACD may be digital data. The ACD also includes a communications interface to the link 220 to insert and/or remove the corresponding digitized bitstream that is addressed to it.

During initialization of the communications link 220, each one of the ACD's coupled to the link 220 is assigned a unique address. After the HD audio controller 210 is initialized and a corresponding driver software is loaded, the controller 210 queries each ACD to determine capabilities of the corresponding codec.

With retasking of any I/O port, functionality, and/or task previously performed by a particular I/O port may be dynamically changed. A request to change the task may occur in response to a newly detected hardware component, an application program generating the request, a user generating the request, and/or in response to a change made in another I/O port of the ACD. If a user plugs in a headphone into a jack of the I/O port that was previously tasked to receive a microphone input, then the jack retasking functionality of the HD audio system 200 will automatically detect the headphone as an audio output device, retask the I/O port from the first task of receiving an analog input signal (from the microphone) to a second task of generating the audio output for the headphone, and direct the digital bitstream to the retasked jack.

Corresponding to each jack 236, 245, 247, and the jack group 256 is a light source 270, 272, 274, and the light group 276. The light source 270, 272, 274, and the light group 276 is operable to emit a color that is responsive to a corresponding task performed by the I/O port. That is, the color is changed from a first color corresponding to a first task performed by the I/O port to a second color corresponding to a second task performed by the I/O task in response to the retasking. In the depicted embodiment, the HD audio system 200 includes a general purpose I/O (GPIO) controller 260 that is coupled to the bus 150 for controlling the light source 270, 272, 274, and the light group 276. In an embodiment, the light source 270, 272, 274, and the light group 276 includes a light emitting diode (LED) operable to emit at least two different colors. In a particular embodiment, the GPIO controller 260 communicates with the light source 270, 272, 274, and the light group 276 via a communications link (or bus) 292 such as the SMBus. In another embodiment, separate control signals may be provided to the light source 270, 272, 274, and the light group 276.

In a particular embodiment, the GPIO controller 260 reads a status of the task performed by the I/O port from the memory 120 via the bus 150, looks up a color code corresponding to a task being performed by each I/O port, and adjusts the color accordingly. In another embodiment, the HD audio controller 210 writes a color code corresponding to each task performed by an I/O port in the memory 120. When the task is switched from a first task to a second task, a corresponding change is made to the color code from a first color code to a second color code. The GPIO controller 260 reads the color code and switches the color of the light source 270, 272, 274, and the light group 276 accordingly. In an embodiment, the first task is an idle task prior to receiving the retasking request, the idle task being indicative of an inactivity of the I/O port, wherein the first color code is selected to indicate an absence of color.

The ability to dynamically change the color corresponding to a task performed by the I/O port advantageously improves user experience. For example, a user may elect to insert a headphone into a front jack of an audio codec device. In response to the insertion of the headphone, the IHS may automatically disable or mute the rear speakers and indicate the change by changing the colors assigned to the rear jack from a green color (indicating in use) to a black color (indicating not in use). In addition, the dynamic matching of the colors improves user experience by signaling an error when a user attempts to perform a non-supported function, such as inserting an incompatible connector of the multimedia device in to the I/O port.

Figure 3:
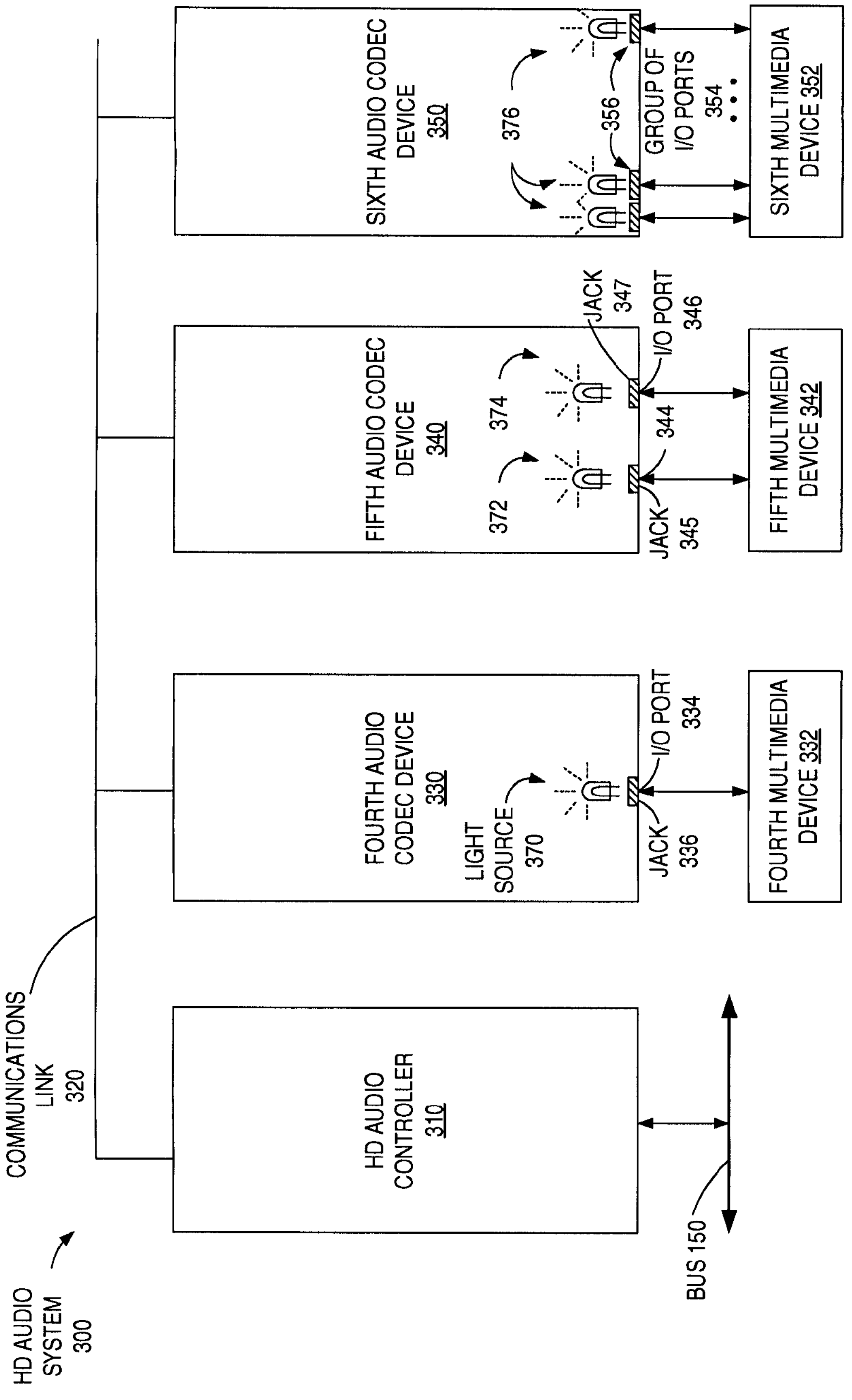
FIG. 3 illustrates a block diagram of a HD audio system with an audio codec for color control, according to an embodiment.

FIG. 3 illustrates a block diagram of a HD audio system 300 with an audio codec for color control, according to an embodiment. In the depicted embodiment, the HD audio system 300 is substantially similar to the HD audio system 200 except for the GPIO controller 260. In the depicted embodiment, the HD audio system 300 includes a HD audio controller 310, coupled to at least one ACD via a communications link 320. The HD audio controller 310 is coupled to the bus 150 described with reference to FIG. 1. In a particular embodiment, the HD audio controller 310 is substantially the same as the HD audio controller 160 and the multimedia devices 332, 342, and 352 are substantially the same as the multimedia device 190 described with reference to FIG. 1.

In the depicted embodiment, the at least one ACD includes a fourth ACD 330, a fifth ACD 340, and a sixth ACD 350. The fourth ACD 330 is coupled to the multimedia devices 332, 342, and 352 via I/O ports 334, 344 and 346, and the group of I/O ports 354 respectively. Each one of the I/O ports 334, 344, 346 and the port group 354 has a corresponding jack 336, 345, 347, and the jack group 356 for receiving a mating connector from the multimedia device. In this embodiment, the functionality of the GPIO controller 260 is incorporated into each ACD. That is, each one of the fourth ACD 330, the fifth ACD 340, and the sixth ACD 350 is operable to control the light source 370, 372, 374, and the light group 376 in response to a task performed by an I/O port of each ACD. In an embodiment, the light source 370, 372, 374, and the light group 376 includes a LED operable to emit at least two different colors.

Figure 4:
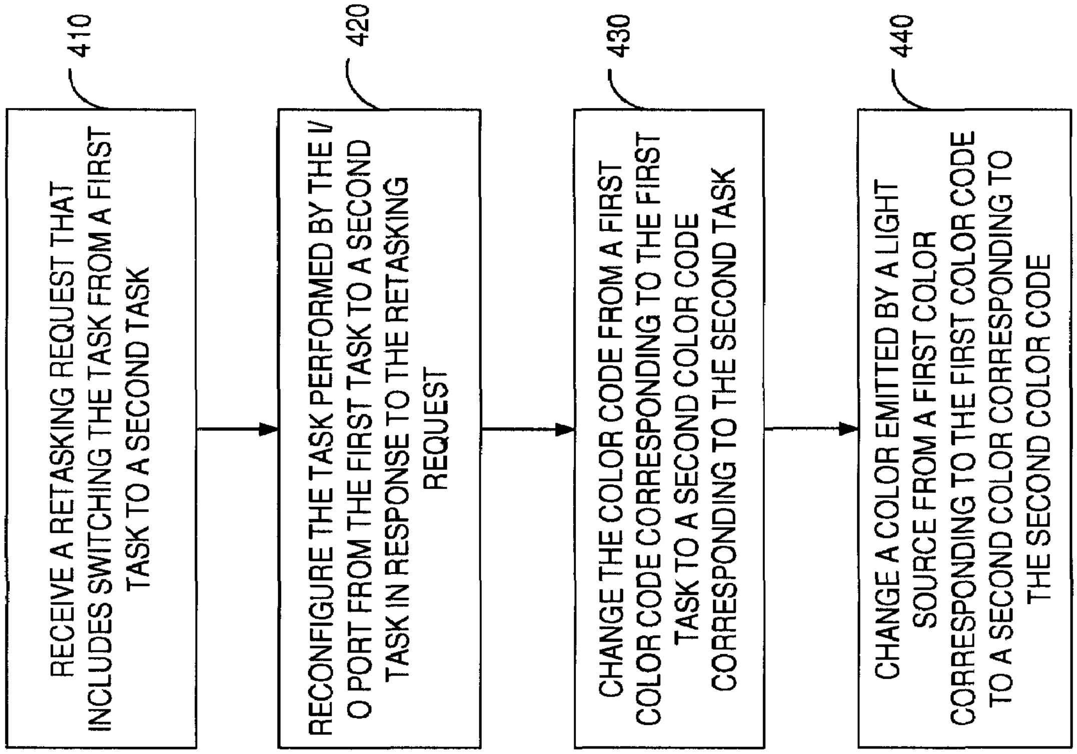
FIG. 4 is a flow chart illustrating a method for dynamically adjusting a color code corresponding to a task performed by an I/O port, according to an embodiment.

FIG. 4 is a flow chart illustrating a method for dynamically adjusting a color code corresponding to a task performed by an I/O port, according to an embodiment. In a particular embodiment, the color code is dynamically adjusted using at least one of HD audio system 200 described with reference to FIG. 2, and HD audio system 300 described with reference to FIG. 3. At step 410, a retasking request that includes switching the task from a first task to a second task is received. In a particular embodiment, the retasking request may be received in response to an event or action such as a connector for a multimedia device being plugged in to the I/O port, an application program generating the retasking request, a user generating the retasking request, and/or a change in another I/O port causing the generation of the retasking request. At step 420, the task performed by the I/O port is reconfigured from the first task to a second task in response to the retasking request. At step 430, the color code is changed from a first color code corresponding to the first task to a second color code corresponding to the second task in response to the reconfiguring.

Various steps described above may be added, omitted, combined, altered, or performed in different orders. For example, an additional step may be performed after step 430 to convert the color code to a corresponding color via a lookup table. At step 440, a color emitted by a light source is changed from a first color corresponding to the first color code to a second color corresponding to the second color code. In a particular embodiment, the reconfiguring at step 420 and the changing at step 430 and 440 occurs dynamically and automatically without user intervention, e.g., without a user having to provide inputs to reconfigure I/O ports for changing the color.

Several advantages are achieved according to the illustrative embodiments presented herein. The embodiments advantageously provide an improved user experience while connecting different HD audio components. For example, a user may elect to insert a headphone into a front jack of an audio codec device. In response to the insertion of the headphone, the IHS may automatically disable or mute the rear speakers and indicate the change by changing the colors assigned to the rear jack from a green color (indicating in use) to a black color (indicating not in use). In addition, the dynamic matching of the colors improves user experience by signaling an error when a user attempts to perform a non-supported function, such as inserting a microphone in a headphone jack.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for dynamically adjusting a color code corresponding to a task performed by each of a plurality of input/output (I/O) ports, the method comprising:

receiving, in response to the connection of a device with a first I/O port of a first audio codec device, a retasking request that includes switching the tasks performed by each of the first I/O port and a second I/O port of a second audio codec device;

reconfiguring, in response to the retasking request, the task performed by the first I/O port from an initial first I/O port task to a subsequent first I/O port task;

reconfiguring, in response to the retasking request, the task performed by the second I/O port from an initial second I/O port task to a subsequent second I/O port task;

changing, in response to the reconfiguring of the task performed by the first I/O port, a first I/O port color code from a initial first I/O port color code corresponding to the initial first I/O port task to a subsequent first I/O port color code corresponding to the subsequent first I/O port task; and changing, in response to the reconfiguring of the task performed by the second I/O port, a second I/O port color code from a initial second I/O port color code corresponding to the initial second I/O port task to a subsequent second I/O port color code corresponding to the subsequent second I/O port task.

2. The method of claim 1, wherein the first I/O port color code is indicative of a first I/O port activity and a first I/O port function, and the second I/O port color code is indicative of a second I/O port activity and a second I/O port function.

3. The method of claim 2, wherein the subsequent first I/O port color code is indicative of an active first I/O port activity with an audio out first I/O port function, and the subsequent second I/O port color code is indicative of an inactive second I/O port activity with a mute second I/O port function.

4. The method of claim 1, wherein the changing of the first I/O port color code is communicated via a communications link to a first I/O port light source, and wherein the first I/O port light source is controlled to emit a first color corresponding to the initial first I/O port color code and a second color corresponding to the subsequent first I/O port color code.

5. The method of claim 4, wherein the first I/O port light source includes a light emitting diode (LED) operable to emit at least two different colors.

6. The method of claim 1, wherein the changing of the second I/O port color code is communicated via a communications link to a second I/O port light source, and wherein the second I/O port light source is controlled to emit a first color corresponding to the initial second I/O port color code and a second color corresponding to the subsequent second I/O port color code.

7. The method of claim 6, wherein the second I/O port light source includes a light emitting diode (LED) operable to emit at least two different colors.

8. The method of claim 1, wherein the reconfiguring the task performed by the first I/O port includes changing the first I/O port configured to receive an audio input as the initial first I/O port task to provide an audio output as the subsequent first I/O port task.

9. The method of claim 1, wherein the initial first I/O port task is an idle task prior to receiving the retasking request, the idle task being indicative of an inactivity of the first I/O port, and wherein the first I/O port color code is selected to indicate an absence of color.

10. A high definition (HD) audio system comprising:

a first audio codec having a first I/O port and a corresponding first I/O port light source, the corresponding first I/O port light source being controlled by the first audio codec to emit a color in accordance with a task performed by the first I/O port;

a second audio codec having an second I/O port and a corresponding second I/O port light source, the corresponding second I/O port light source being controlled by the second audio codec to emit a color in accordance with a task performed by the second I/O port; and a multimedia device capable of being automatically identified when plugged in to the first audio codec via the first I/O port, wherein the task performed by the first I/O port is changed from an initial first I/O port task to a subsequent first I/O port task and the task performed by the second I/O port is changed from an initial second I/O port task to a subsequent second I/O port task in response to identifying the multimedia device, and wherein the color of the first I/O port light source is automatically adjusted from a first color corresponding to the initial first I/O port task to a second color corresponding to the subsequent first I/O port task while the color of the second I/O port light source is automatically adjusted from a first color corresponding to the initial second I/O port task to a second color corresponding to the subsequent second I/O port task.

11. The system of claim 10 further comprising:

an audio controller coupled to the first audio codec and the second audio codec, the audio controller being operable to change the task performed by the first I/O port from the initial first I/O port task to the subsequent first I/O port task and change the task performed by the second I/O port from the initial second I/O port task to the subsequent second I/O port task in response to identifying the multimedia device.

12. The system of claim 10, wherein the second color corresponding to the subsequent first I/O port task is indicative of an active first I/O port activity with an audio out first I/O port function, and the second color corresponding to the subsequent second I/O port task is indicative of an inactive second I/O port activity with a mute second I/O port function.

13. The system of claim 10, wherein the first I/O port light source includes a LED operable to emit at least two different colors and the second I/O port light source includes a LED operable to emit at least two different colors.

14. The system of claim 10, wherein the audio codec changes the color automatically in accordance with the task, without user intervention.

15. The system of claim 10, wherein the initial first I/O port task includes receiving an audio input and the subsequent first I/O port task includes generating an audio output.

16. The system of claim 10, wherein the initial first I/O port task is an idle task prior to the multimedia device being plugged in to the first I/O port, the idle task being indicative of an inactivity of the first I/O port, and wherein the first color corresponding to the initial first I/O port task is selected to indicate an absence of the color.

17. An information handling system (IHS) comprising:

a processor;

an I/O controller coupled to the processor via a bus;

a first audio codec coupled to the I/O controller, the first audio codec having a first I/O port, the first I/O port having a corresponding first I/O port light source operable to emit a color in accordance with a task performed by the first I/O port;

a second audio codec coupled to the I/O controller, the second audio codec having a second I/O port, the second I/O port having a corresponding second I/O port light source operable to emit a color in accordance with a task performed by the second I/O port;

a multimedia device capable of being automatically identified when coupled to the first audio codec via the first I/O port, wherein the task performed by the first I/O port is directed to be changed by the processor from an initial first I/O port task to a subsequent first I/O port task and the task performed by the second I/O port is directed to be changed by the processor from an initial second I/O port task to a subsequent second I/O port task in response to identifying the multimedia device; and a light source controller coupled to the bus, wherein the light source controller is operable to control the color emitted by each of the first I/O port light source and the second I/O port light source, and wherein the color of the first I/O port light source is adjusted from a first color corresponding to the initial first I/O port task to a second color corresponding to the subsequent first I/O port task while the color of the second I/O port light source is adjusted from a first color corresponding to the initial second I/O port task to a second color corresponding to the subsequent second I/O port task.

18. The system of claim 17, wherein the first audio codec causes a change in the color of the first I/O port light source automatically in accordance with the subsequent first I/O port task and the second audio codec causes a change in the color of the second I/O port light source automatically in accordance with the subsequent second I/O port task, without user intervention.

19. The system of claim 17, wherein the initial first I/O port task includes receiving an audio input and the subsequent first I/O port task includes generating an audio output.

20. The system of claim 17, wherein the initial first I/O port task is an idle task prior to the multimedia device being plugged in to the first I/O port, the idle task being indicative of an inactivity of the first I/O port, and wherein the first color corresponding to the initial first I/O port task is selected to indicate an absence of the color.

* * * * *